Aug. 4, 1953     A. B. SEPPMANN     2,647,723
CONNECTING ROD SPREADER
Filed March 4, 1950
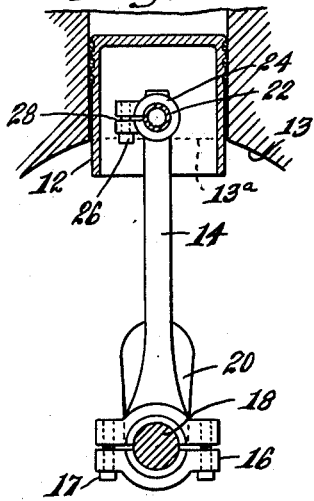
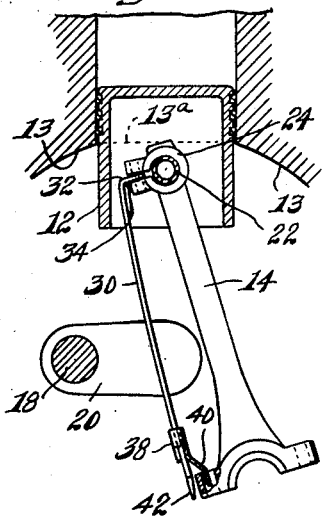
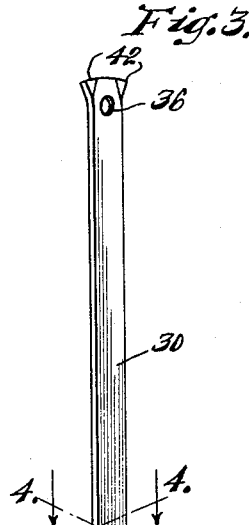
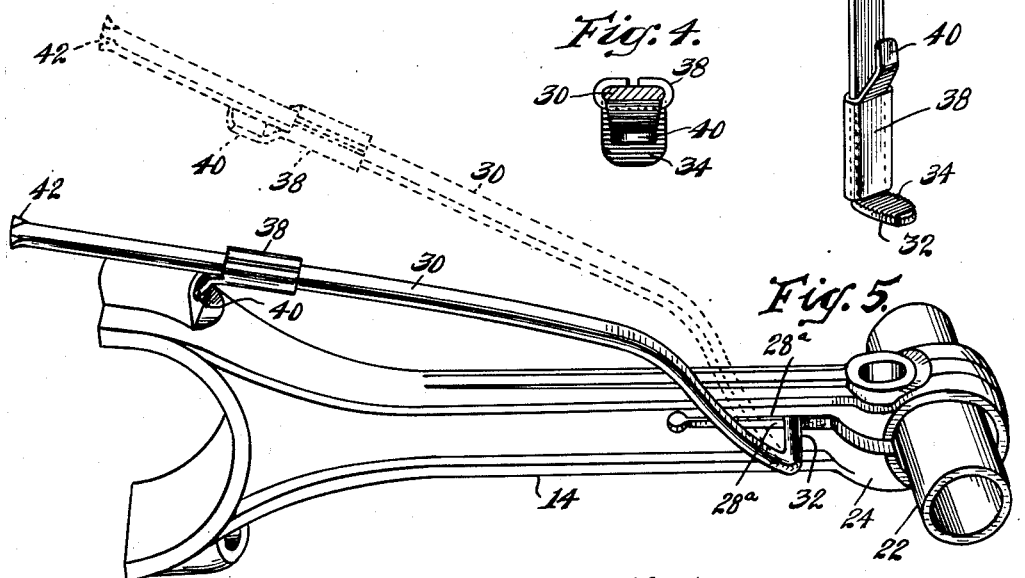
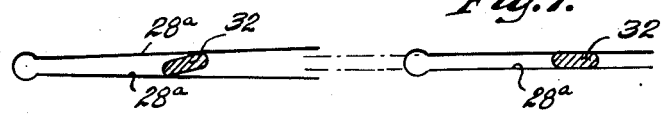
Inventor:
Alfred B. Seppmann.
By Baiv & Freeman
Attys.

Patented Aug. 4, 1953

2,647,723

UNITED STATES PATENT OFFICE 2,647,723

CONNECTING ROD SPREADER

Alfred B. Seppmann, Mankato, Minn.

Application March 4, 1950, Serial No. 147,673

1 Claim. (Cl. 254—131)

This invention relates to a service tool for garages, automobile repair shops and the like designed to spread the wrist pin bearing of a connecting rod so that the wrist pin can be removed from the piston without removal of the piston from the cylinder (which necessitates removal of the head from the engine block) when changing a connecting rod.

One object of the invention is to provide a tool which is comparatively simple and inexpensive to manufacture and which can be operated conveniently in the crank case of the engine after the oil pan has been dropped.

Another object is to provide a tool in the form of a lever having means to enter the slot of a wrist pin bearing of a connecting rod and to spread the slot when the lever is swung to a predetermined position, thereby loosening the bearing around the pin so that the pin can be removed.

Still another object is to provide a locking lug slidable along the lever and engageable with one of the bearing cap bolt holes of the connecting rod to retain the slot of the wrist pin bearing in the spread position without having to hold it in that position manually, the lock being a convenience in handling the connecting rods when removing one from installed position and replacing it with another.

With these and other objects in view, my spreader consists in the construction, arrangement and combination of the various parts thereof whereby the objects contemplated are attained, as hereinafter more fully set forth, pointed out in my claim and illustrated in the accompanying drawing, wherein:

Figure 1 is a partially diagrammatic sectional view through a cylinder and piston showing the piston in the lowermost operating position;

Figure 2 is a similar view showing my connecting rod spreader applied to a Chevrolet connecting rod and showing the piston in a lowered position after the connecting rod is removed from the crank shaft so that the piston pin can be removed from the piston thereby permitting removal of the connecting rod;

Figure 3 is a perspective view of one form which my tool may take;

Figure 4 is a sectional view on the line 4—4 thereof;

Figure 5 is a perspective view of a modified form of tool to cooperate with a different type of connecting rod such as the type used in Buicks and Studebakers;

Figure 6 is an enlarged sectional view on the line 6—6 of Figure 5; and

Figure 7 is a similar sectional view showing the position of the parts before the slot of the connecting rod is spread.

On the accompanying drawings I have used the reference numeral 10 to indicate the cylinder wall of an automobile or the like and 12 the piston thereof. The usual connecting rod 14 is illustrated in Figure 1 coacting with the crank pin 18 of the crank shaft, one arm of which is illustrated at 20.

Figure 1 shows the piston in its lowermost position, the upper end of the connecting rod being provided with the usual wrist pin 22 retained in a split wrist pin bearing 24 by a clamp screw 26. The bearing 24 is slotted as indicated at 28 to permit the bolt to clamp the bearing on the wrist pin 22.

It is the usual practice in order to replace a connecting rod to remove both the oil pan and the head of the engine. The bearing cap can then be removed from the connecting rod and the entire assembly of piston and connecting rod lifted out of the cylinder, after which the connecting rod can be replaced with respect to the piston and then both returned to the cylinder. Considerable time can be saved however if the connecting rod can be removed without removing the head. I have provided a tool for making this possible which will now be described.

My tool which I term a "connecting rod spreader" consists of a bar 30 having substantially a right angle bend 32 at one end that serves as a spreader cam. The cam 32 is preferably serrated or knurled as at 34 to prevent slipping when in use. The opposite end of the bar 30 may be provided with an opening 36 for hanging up the tool.

A slide 38 is provided on the bar 30 which terminates in a lock lug 40, the purpose of which will hereinafter appear. The bar 30 may be upset or flattened adjacent the opening 36 as indicated at 42 to prevent the slide 38 from coming off the bar.

To use my tool the clamp screw 26 is first removed by means of an extension socket wrench while the piston 12 is in the lowered position of Figure 1. The connecting rod bearing cap 16 is also removed by removal of the bolts 17 following which the rod spreader tool may be applied to the connecting rod as indicated by dotted lines in Figure 2. Holding the tool in this particular position permits the cam 32 to be inserted in the slot 28 whereupon the bar 30 may be used as a lever and swung to the full line position shown. This is sufficient to spread the wrist pin bearing 24 so that the wrist pin can be slid out of the piston after the piston is lowered from the position of Figure 1 to the position of Figure 2.

The crank case indicated at 13 has an upper limit indicated by the dotted line 13a. In normal operation of the engine the wrist pin 22 never gets lower than this line as shown in Figure 1. When the bearing cap 16 is removed however and the crank 20 is moved to the position approximately as shown in Figure 2, the connecting rod and piston can be lowered enough as illustrated to permit removal of the wrist pin.

After it is removed of course the connecting rod can be dropped out of the piston during which time the rod spreader remains connected with the connecting rod because of the lock lug 40 entering one of the bearing cap holes in the connecting rod. The worn connecting rod can then be replaced by a new one to which the tool has been applied in a similar manner so as to keep the bearing 24 spread until the wrist pin is reinserted. The tool can then be removed, the piston pushed up in the cylinder and the bearing cap replaced on the connecting rod.

In Figures 5, 6 and 7 I show a modified form of tool having substantially the same characteristics as the one already referred to except being provided with a cam end 32 of different shape so as to fit in a modified type of connecting rod slot 28a. In this case the tool is operated by twisting it in the slot, it being first inserted as shown in Figure 7 and then twisted to the position shown in Figure 6 which effects spreading of the slot as obvious by a comparison of these two figures. The cam 32 is preferably tapered both in width and thickness so as to accommodate slots of various widths by first pushing the cam into the slot as far as it will go and then twisting it. The taper in both width and thickness is shown in Figure 5.

In some instances it is difficult to gain ready access to the wrist pin for removing it after the bearing 24 has been loosened on it. There is usually about ¼" play between the ends of this bearing and the wrist pin bosses of the piston. Accordingly, my rod spreader tool can be used to aid in the removal of the wrist pin by alternately releasing and engaging the bearing 24 with respect to the wrist pin, between which operations the bearing is shifted from one boss to the other.

This will effect a ¼" movement of the wrist pin each operation so that it is finally moved over to a position to permit the bearing to clear it. When the connecting rod is replaced the bearing can be regripped on the piston pin and the alternate operations performed for shifting the wrist pin back to its proper position with respect to the wrist pin bosses of the piston.

From the foregoing specification it will be obvious that I have provided a relatively simple tool for spreading the slot in a wrist pin bearing of a connecting rod. The tool is so designed that it can be inserted into position from below the cylinders after the oil pan has been removed and when operated can be locked in position to permit ready handling of the connecting rod during its removal and replacement. The entire operation can be performed without removing the head of the engine which saves considerable time of the serviceman. The tool accordingly soon pays for its cost.

Some changes may be made in the construction and arrangement of the parts of my device without departing from the real spirit and purpose of my invention, and it is my intention to cover by claim any modified forms of structure or use of mechanical equivalents which may be reasonably included within its scope.

I claim as my invention:

In a connecting rod spreader, an elongated bar adapted to serve as a lever and having a cam at one end, said cam being adapted to enter the slot of a wrist pin bearing of a connecting rod for spreading the slot when the lever is swung toward the rod, and a sliding lock element on said bar having a finger closely adjacent one side of the bar and projecting in a direction generally parallel to the bar for entering one of the connecting rod bearing holes when said lever is swung to a position against the boss in which said hole is located to retain the tool in operative position while handling the connecting rod.

ALFRED B. SEPPMANN.

References Cited in the file of this patent

UNITED STATES PATENTS

| Number | Name | Date |
|---|---|---|
| 1,258,016 | Kepner | Mar. 5, 1918 |
| 1,370,397 | Axelton | Mar. 1, 1921 |
| 2,387,430 | Daubs | Oct. 23, 1945 |
| 2,464,103 | Swenson | Mar. 8, 1949 |